United States Patent Office 3,806,519
Patented Apr. 23, 1974

3,806,519
ISOINDOLINONE YELLOW PIGMENTS
Pritam Singh Dhaliwal, Edison, N.J., assignor to E. I. du Pont de Nemours and Company, Wilmington, Del.
No Drawing. Filed Sept. 27, 1972, Ser. No. 292,504
Int. Cl. C07d 27/00, 27/40, 27/42
U.S. Cl. 260—325        2 Claims

ABSTRACT OF THE DISCLOSURE

Novel isoindolinone yellow pigments are prepared by the reaction of phenanthrene 9,10-dicarboximide with phosphorus pentachloride, followed by reaction with an aromatic diamine or hydrazine.

BACKGROUND OF THE INVENTION

Although a number of lightfast organic pigments have been developed in the blue to green color range, as exemplified by the phthalocyanines, and in the red to violet range, as exemplified by the quinacridones, there has been much less success with the development of such pigments in the yellow range. One yellow organic pigment that has achieved some measure of success is the condensation product of p-phenylene diamine and 3,3,4,5,6,7-hexachloro isoindoline-1-one, as disclosed in U.S. Pat. 2,973,358. Its use is frequently limited, however, in those applications requiring a high strength and a minimum of solubility in the medium to be pigmented.

SUMMARY OF THE INVENTION

In accordance with the invention there are provided novel isoindolinone compounds, suitable for use as yellow pigments, of the formula

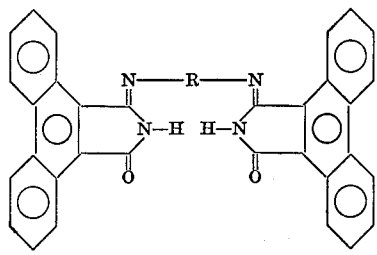

wherein R is selected from the group consisting of

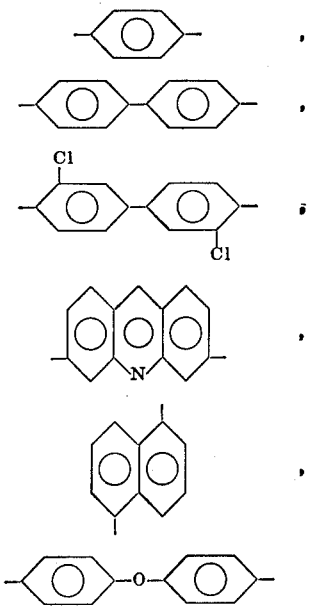

and a covalent bond.

These isoindolinone compounds are readily prepared by reacting phenanthrene-9,10-dicarboximide (J. Chem. Soc. 5544, 1968) with phosphorus pentachloride and the dichloride thus formed is reacted, without isolation, with an aromatic diamine, corresponding to the above divalent radicals, or with hydrazine. In the case where the diamine is p-phenylenediamine, there is produced a bright yellow solid, identified as bis-(4,5,6,7-dibenzoisoindolin-1-one-3-ylidene) - p - phenylenediamine according to the following reaction:

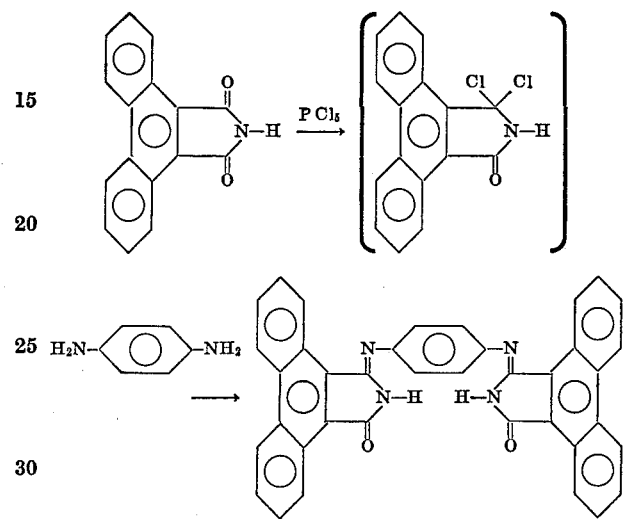

The isoindolinone compounds of the invention are useful as yellow-colored pigments, being particularly advantageous from the standpoint of their high strength and low solubility in common organic solvents. These properties, which will be demonstrated on a comparative basis in Example 1 below, make the pigments attractive for use in a wide range of coating compositions, synthetic fibers, plastics and the like.

The following examples illustrate the practice of the invention. The "Standard" referred to therein for control purposes is a commercial pigment mentioned above which is the reaction product of p-phenylenediamine and 3,3,4,5,6,7-hexachloroisoindoline-1-one.

EXAMPLE 1

Preparation of bis-(4,5,6,7-dibenzoisoindolin-1-one-3-ylidene)-p-phenylenediamine, with pyridine In a 5 l. flask, a mixture of 20 g. of phenanthrene-9,10-dicarboximide and 25.0 g. of phosphorus pentachloride and 2300 ml. of dry orthodichlorobenzene was heated with stirring under reduced pressure (18–35 mm.) at 120–130° C. and maintained at this temperature for one and one-quarter hours. During this period, the formed phosphorus oxychloride and some orthodichlorobenzene was distilled off (distillate volume about 300 ml.).

At the end of this time, 10 g. of dry pyridine was added to the above solution and allowed to stir for 5 minutes at 120–130° C. To this mixture was then added 4.2 g. p-phenylenediamine dissolved in 600 ml. of dry orthodichlorobenzene at 130° C. Immediately upon addition of the p-phenylenediamine solution, a reddish-yellow solid began to precipitate from the reaction mixture. The mixture was then stirred at 120–130° C. for 2 hours. After completion of the reaction, the mixture was filtered at 120–130° C., and the precipitate was washed successively with alcohol, water, and alcohol and dried at 60° C. A yield of 15.0 g. of a reddish-yellow solid was obtained.

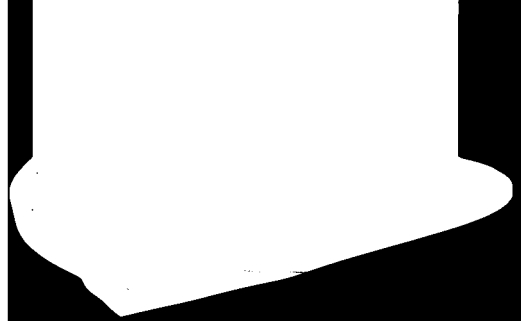

hours. The solid was filtered from the hot mixture and washed successively with alcohol, water, and alcohol and dried at 60° C. A yield of 9.3 g. was obtained.

For analytical purposes, the above solid was successively extracted with boiling nitrobenzene, dimethylformamide, water and dimethylformamide, washed and dried.

*Analysis.*—Found (percent): N=7.84, Cl=10.1. Calc. for $C_{44}H_{24}N_4Cl_2O_2$ (percent): N=7.87, Cl=10.1.

The analysis and the IR spectrum confirmed the identity of the compound as bis-(4,5,6,7-dibenzoisoindolin-1-one-3-ylidene)-3',3''-dichlorobenzidine.

In order to enhance the dispersibility of the above crude product, a 2.5 g. sample and 200 g. glass beads and 100 ml. acetone was milled for 72 hours. The mill charge was filtered, washed with alcohol, water, and alcohol and dried at 60° C. This product was redder, more intense and 40% stronger than the Standard and after 500 hours Fade-O-Meter exposure showed lightfastness comparable to the Standard both in tint and masstone.

A 2 g. sample of the crude product with 600 g. 1/8 inch steel shot and 100 ml. acetone was milled for 72 hours. The mill charge was extracted with 1% sulfuric acid at about 90° C., filtered, and the presscake was washed free of acid and sulfate and subsequently dried at 60° C. This product was superior in transparency to the crude product, presumably as a result of the reduced particle size, and showed a considerably greater two-tone effect in automotive metallics relative to the Standard. Both by rubout and in paint, the product was more intense, more transparent, and stronger (40%) than the Standard. It was approximately the same shade and strength as Flavanthrone. After 500 hours in the Fade-O-Meter, the product showed lightfastness comparable to the Standard both in tint and masstone.

EXAMPLE 5

Preparation of bis-(4,5,6,7-dibenzoisoindolin-1-one-3-ylidene)-1',5''-naphthalenediamine A mixture of 5 g. phenanthrene-9,10-dicarboximide, 6.25 g. of phosphorus pentachloride and 1300 ml. of dry orthodichlorobenzene was heated with stirring at 120–130° C. under reduced pressure (18–30 mm.) for a period of one and one-quarter hours. During this period, the formed phosphorus oxychloride along with orthodichlorobenzene was distilled off (distillate volume about 250 ml.).

At the end of this time, 2.5 g. of dry pyridine was added and the solution was stirred at 120–130° C. for 5 minutes. To this solution was then added 1.6 g. 1,5-diaminonaphthalene dissolved in 650 ml. orthodichlorobenzene at 130° C. Immediately upon the addition of the diaminonaphthaleen solution, a bright red solid began to precipitate out. The mixture was then stirred at this temperature for 2 hours, filtered hot, washed with alcohol, water, and alcohol and subsequently dried at 60° C. A yield of 2.25 g. was obtained.

A mixture of 2.25 g. of above solid and 300 ml. dimethylformamide was heated rapidly to reflux and maintained at this temperature for 20 minutes. The solid was filtered hot, washed with alcohol, water, and alcohol and dried at 60° C. The recovery was 2.0 g.

*Analysis.*—Found (percent): N=9.02, Calc. for $C_{42}H_{24}N_4O_2$ (percent): N=9.09.

The analysis and IR spectrum showed that the above product was bis-(4,5,6,7-dibenzoisoindolin-1-one-3-ylidene)-1',5'-diaminonaphthalene. This compound, after 500 hours Fade-O-meter exposure showed good lightfastness.

EXAMPLE 6

Preparation of bis-(4,5,6,7-dibenzoisoindoline-1-one-3-ylidene)-hydrazine

A mixture of 10 g. of phenanthrene-9,10-dicarboximide and 12.5 g. phosphorus pentachloride and 2500 ml. dry orthodichlorobenzene was heated with stirring under reduced pressure (18–35 mm.) at 120–130° C., and maintained at this temperature for one and one-quarter hours. During this period, the formed phosphorus oxychloride along with some orthodichlorobenzene was distilled off under reduced pressure (distillate volume about 500 ml).

At the end of thise time, 1.0 g. of hydrazine was added to the above solution. Immediately upon addition of the hydrazine, a bright yellow solid began to precipitate from the reaction mixture. The mixture was stirred at 120–130° C. for 2 hours. After completion of the reaction, the mixture was filtered at 120–130° C. and the precipitate was washed successively with alcohol, water, and alcohol and dried at 60° C. A yield of 4.75 g. of a yellow solid was obtained.

The product was considered to be bis-(4,5,6,7-dibenzoisoindolin-1-one-3-ylidene)-hydrazine.

EXAMPLE 7

Preparation of bis-(4,5,6,7-dibenzoisoindolin-1-one-3-ylidene)-3,6-diaminoacridine Using the exact same conditions as Example 6 above, but using 4.5 g. of diaminoacridine as the diamine, a greenish-yellow pigment identified as bis-(4,5,6,7-dibenzoisoindolin-1-one-3-ylidene) - 3,6 - diaminoacridine was obtained.

EXAMPLE 8

Preparation of bis-(4,5,6,7-dibenzoisoindolin-1-one-3-ylidene)-4,4'-diaminodiphenyl ether By using 4.5 g. of 4,4'-diaminodiphenyl ether as the diamine and the same conditions as Example 6, a green-yellow solid identified as bis(4,5,6,7-dibenzoisoindolin-1 - one - 3 - ylidene) - 4,4' - diaminodiphenyl ether was obtained.

What is claimed is:

1. An isoindolinone compound of the formula,

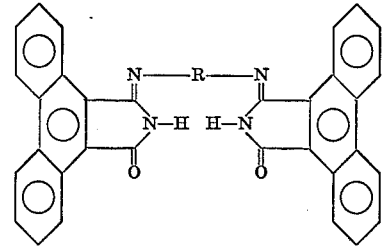

wherein R is selected from the group consisting of

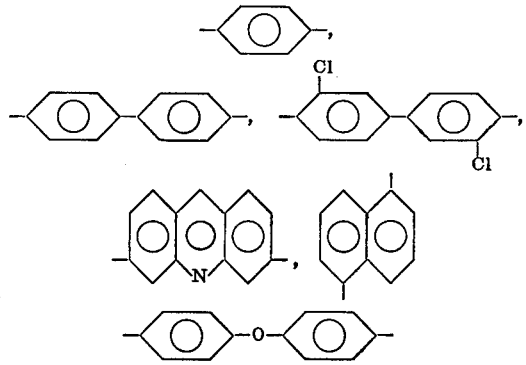

and a covalent bond.

2. Bis-(4,5,6,7-dibenzoisoindolin - 1 - one-3-ylidene)-p-phenylenediamine.

References Cited

UNITED STATES PATENTS 2,973,358   2/1961   Pugin _____ 260—325 X

JOSEPH A. NARCAVAGE, Primary Examiner

U.S. Cl. X.R.

260—279, 37 P; 106—288